United States Patent [19]

Fink et al.

[11] Patent Number: 5,102,156
[45] Date of Patent: Apr. 7, 1992

[54] UNIVERSALLY ADJUSTABLE TRAILER HITCH

[75] Inventors: Raymond W. Fink; Wayne E. Sousley, both of Elkhart; Richard L. Fullhart, Goshen, all of Ind.

[73] Assignee: TriMas Corporation, Ann Arbor, Mich.

[21] Appl. No.: 570,336

[22] Filed: Aug. 21, 1990

[51] Int. Cl.⁵ .............................................. B60D 1/00
[52] U.S. Cl. ................................................. 280/495
[58] Field of Search ................... 280/407, 456.1, 460.1, 280/467, 495

[56] References Cited

U.S. PATENT DOCUMENTS

| | | | |
|---|---|---|---|
| 3,294,420 | 12/1966 | Martin | 280/460.1 X |
| 4,032,170 | 6/1977 | Wood | 280/495 |
| 4,405,148 | 9/1983 | Dickerson | 280/495 X |
| 4,648,617 | 3/1987 | Hannappel | 280/456.1 X |

FOREIGN PATENT DOCUMENTS

| | | | |
|---|---|---|---|
| 202798 | 8/1956 | Australia | 280/456.1 |
| 2702728 | 7/1978 | Fed. Rep. of Germany | 280/460.1 |

Primary Examiner—Mitchell J. Hill
Attorney, Agent, or Firm—Leon E. Redman; Malcolm L. Sutherland; Edgar A. Zarins

[57] ABSTRACT

A universally adjustable trailer hitch for attaching to the frames of vehicles of different widths comprising a horizontally disposed tube member with a hitching device centrally attached thereto, the tube member is selectively clamped on each side of the hitching device by a clamping member to a support member to adjustably fix the position of each of the support members with respect to the tube member.

1 Claim, 3 Drawing Sheets

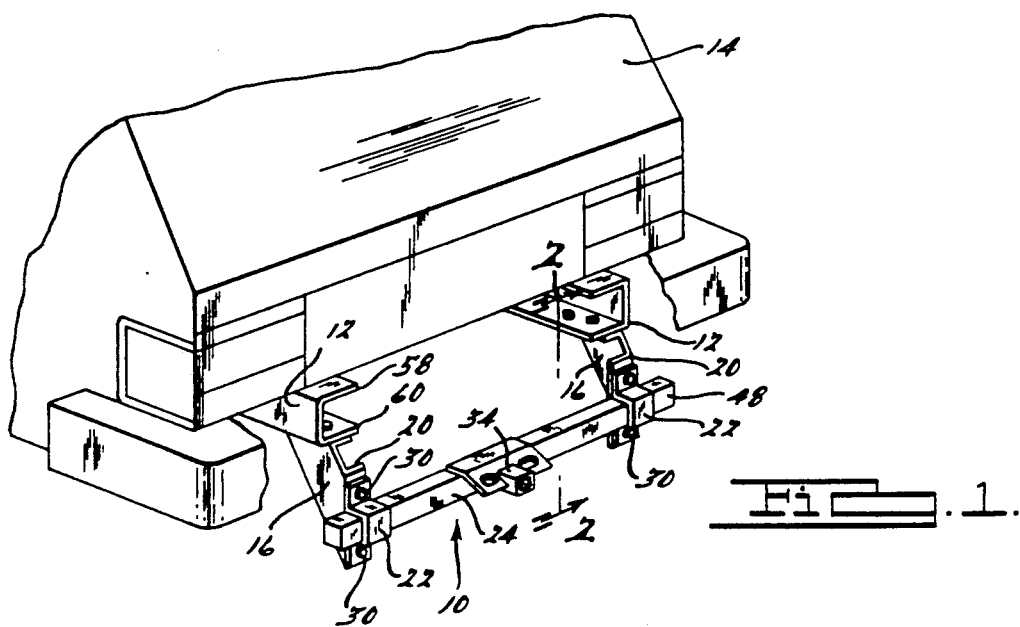

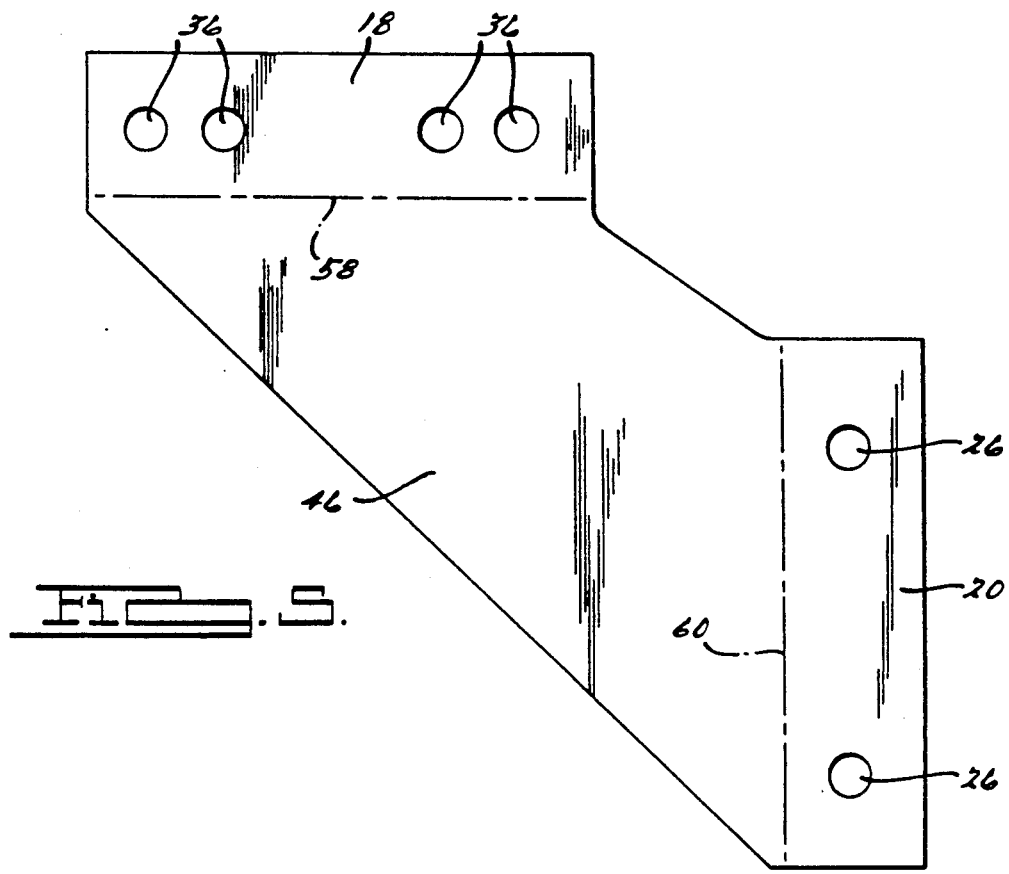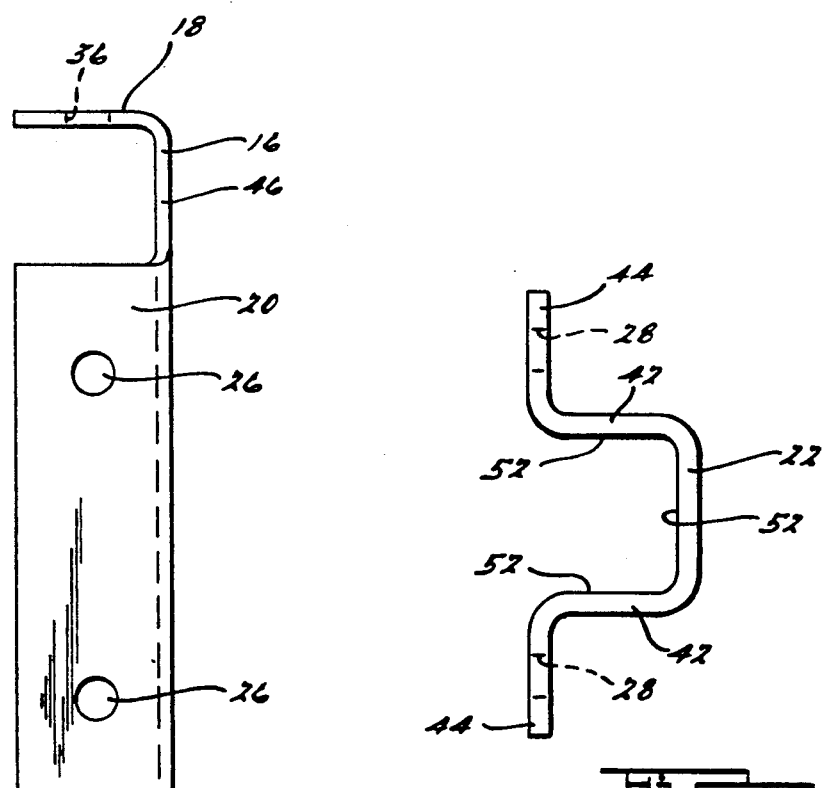

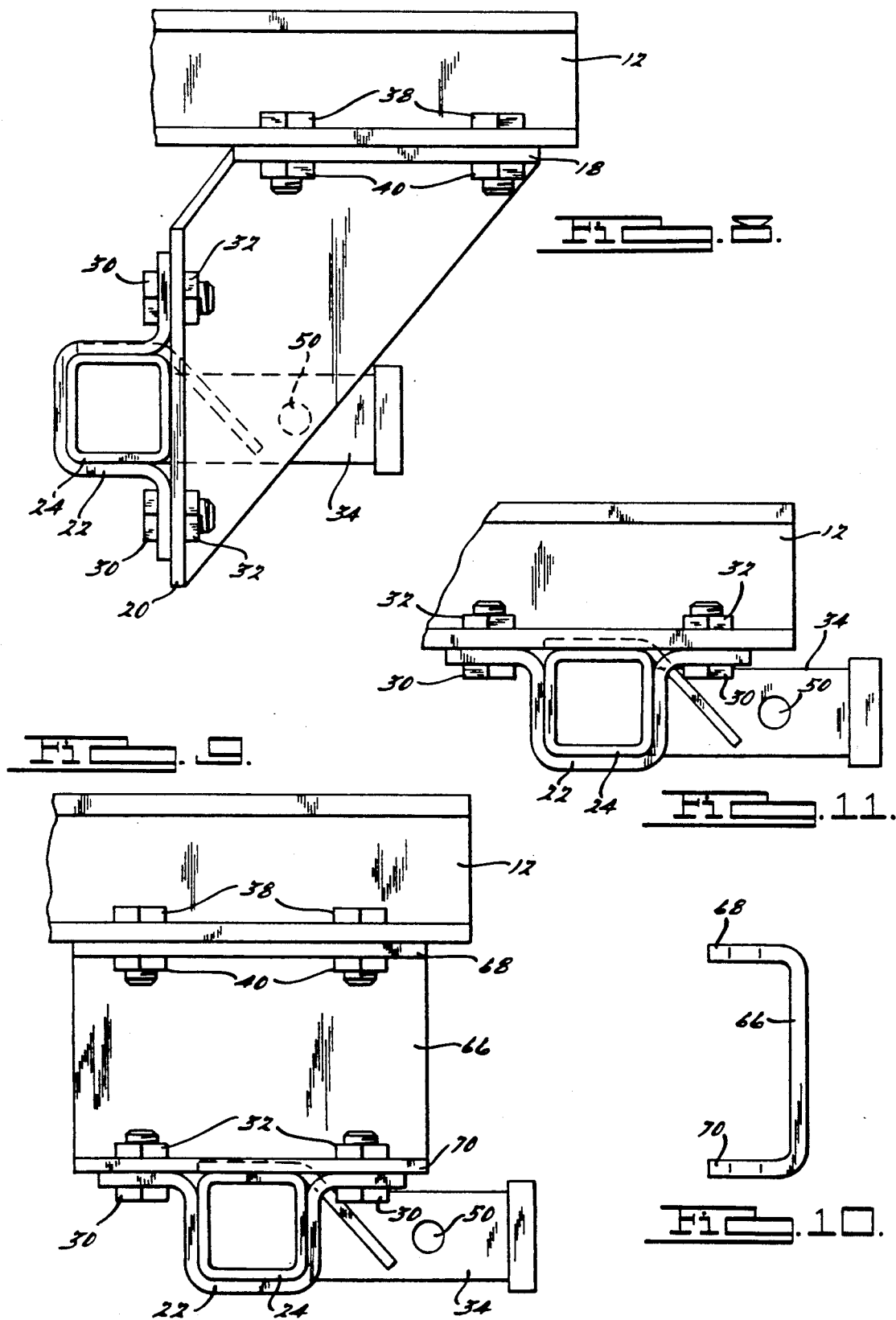

UNIVERSALLY ADJUSTABLE TRAILER HITCH

FIELD OF THE INVENTION

This invention relates to a universally adjustable trailer hitch which can be attached to the frames of vehicles of different widths.

BACKGROUND OF THE INVENTION

The prior art is replete with different forms of trailer hitches for vehicles. Many of these prior art hitches are adapted to fit a limited number of vehicles and are not capable of accommodating vehicles of different widths. The widths between the frame members of different vehicles can vary more than nine inches and it has been generally necessary for firms which sell this type of product to carry a large inventory of trailer hitch assemblies to satisfy the needs of their customers.

Attachment of trailer hitches has also been made more difficult by the many varied vehicle rear bumper configurations, as for example, the increasing use of plastic covered bumpers. Further, many of the more recent bumper designs are totally unsuitable for the normally encountered trailer hitch loads.

While certain of the prior art has addressed the hitch "adjustability" question, they have disclosed highly complex, difficult to use and inherently expensive trailer hitches. Examples of such prior art patents are U.S. Pat. No. 2,408,531 to Reimann et al and U.S. Pat. No. 4,610,458 to Garnham; both of which provide a very limited range of adjustability.

Accordingly, there is a current and important need to provide a simple, easy to use, inexpensive, universally adjustable trailer hitch which can be attached to the frames of a wide range of vehicles of different widths.

SUMMARY OF THE INVENTION

It is a very important object of the present invention to provide a universally adjustable trailer hitch for attaching to the frames of vehicles of different widths comprising a horizontally disposed tube member with a hitching device centrally attached thereto, the tube member is selectively clamped on each side of the hitching device by a clamping member to a support member to adjustably fix the position of each of the support members with respect to the tube member.

It is another very important object of the present invention to provide a universally adjustable trailer hitch for attaching to the frames of vehicles of different widths comprising two bracket members, each bracket member having a generally upwardly facing portion for mating to the vehicle frame for attachment thereto near the rearward end thereof and a generally rearwardly facing portion to which a generally U-shaped clamping member is adjustably attached by fastening means a horizontally disposed tube member is provided with a hitching means centrally attached thereto, said tube member is selectively clamped on each side of said hitching means by one of said U-shaped clamping members to said rearwardly facing portion of each said bracket members to adjustably fix the position of each of said bracket members with respect to said tube member.

It is another important object of the present invention to provide a universally adjustable trailer hitch for attaching to the frames of vehicles of different widths wherein said upwardly facing portion is provided with one or more apertures, at least one aperture in registration with a corresponding aperture in said vehicle frame, each registering aperture receiving a threaded bolt member and each said bolt member threadably receiving a threaded nut for fixedly attaching each said bracket to said vehicle frame.

It is still another important object of the present invention to provide a universally adjustable trailer hitch for attaching to the frames of vehicles of different widths wherein said rearwardly facing portion is provided with one or more apertures, at least one aperture in registration with a corresponding aperture provided in said U-shaped clamping member, each registering aperture receiving said fastening means including threaded bolt members, each said bolt members threadably receiving a threaded nut for adjustably attaching said U-shaped clamping member to said rearwardly facing portion with said tube member selectively clamped therebetween.

It is yet another important object of the present invention to provide a universally adjustable trailer hitch for attaching to the frames of vehicles of different widths wherein each of the legs of the U-shaped portion of said U-shaped clamping member terminates in an outwardly projecting ear, each ear having an aperture therethrough.

It is still another important object of the present invention to provide a universally adjustable trailer hitch for attaching to the frames of vehicles of different widths wherein each of said ears of said U-shaped clamping member projects perpendicularly outwardly from each said legs of said U-shaped portion.

It is still another important object of the present invention to provide a universally adjustable trailer hitch for attaching to the frames of vehicles of different widths wherein said hitching means includes a hitch box.

It is another important object of the present invention to provide a universally adjustable trailer hitch for attaching to the frames of vehicles of different widths wherein said tube member is generally square in cross section and said hitch box projects perpendicularly from the rearwardly facing side of said tube.

It is yet another important object of the present invention to provide a universally adjustable trailer hitch for attaching to the frames of vehicles of different widths wherein said hitch box is a tubular member square in cross section and adapted to receive a hitch ball supporting member.

It is still another important object of the present invention to provide a universally adjustable trailer hitch for attaching to the frames of vehicles of different widths wherein the inwardly facing clamping surfaces of said U-shaped clamping member are in intimate clamping contact with with three faces of said tube member with the fourth forwardly projecting face of said tube member being seated on said rearwardly facing portion of said bracket member.

It is yet another important object of the present invention to provide a universally adjustable trailer hitch for attaching to the frames of vehicles of different widths wherein said bracket member is formed from a flat sheet metal plate and each said upwardly and rearwardly facing portions extend perpendicularly from a body portion of said bracket member.

It is another important object of the present invention to provide a universally adjustable trailer hitch for attaching to the frames of vehicles of different widths wherein each said upwardly and rearwardly facing portions are elongated flat flanges.

It is yet another important object of the present invention to provide a universally adjustable trailer hitch for attaching to the frames of vehicles of different widths wherein the planes of each said upwardly and rearwardly facing elongated flat flanges perpendicularly intersect.

It is still another important object of the present invention to provide a universally adjustable trailer hitch for attaching to the frames of vehicles of different widths wherein each said upwardly and rearwardly facing elongated flat flanges are formed such that they extend perpendicularly outward from said body portion of said bracket member.

It is another important object of the present invention to provide the combination of a universally adjustable trailer hitch for attaching to the frames of vehicles of different widths and a vehicle having two spaced apart longitudinally extending frame members, said trailer hitch comprising two bracket members, each bracket member having a first flange portion for mating of each said bracket members to each said vehicle frame members for attachment thereto near the rearward end thereof by a first fastening means and a second flange portion to which a clamping member is adjustably attached by a second fastening means, a horizontally disposed tube member is provided with a hitching means attached thereto, said tube member is selectively clamped on each side of said hitching means by one of said clamping members to said second flange portion of each said bracket members to adjustably fix the position of each of said bracket members with respect to said tube member to position said hitching means between said frame members.

It is another important object of the present invention to provide the combination of a universally adjustable trailer hitch for attaching to the frames of vehicles of different widths and a vehicle having two spaced apart longitudinally extending frame members wherein said vehicle frame members are generally C-shaped having an upper and lower flange, said first flange portion of each said bracket members attached to said lower flange.

It is another important object of the present invention to provide the combination of a universally adjustable trailer hitch for attaching to the frames of vehicles of different widths and a vehicle having two spaced apart longitudinally extending frame members wherein said upper and lower flanges project inwardly and said first flange portion of each said bracket members are elongated flat flanges attached to said lower flange.

It is yet another important object of the present invention to provide the combination of a universally adjustable trailer hitch for attaching to the frames of vehicles of different widths and a vehicle having two spaced apart longitudinally extending frame members wherein said first flange portion is provided with one or more apertures, at least one said aperture in registration with a corresponding aperture in said lower flange of said C-shaped vehicle frame member, each registering aperture receiving a threaded bolt member and each said bolt member threadably receiving a threaded nut for fixedly attaching each said bracket member to said lower flange.

It is still another important object of the present invention to provide a universally adjustable trailer hitch for attaching to the frames of vehicles of different widths wherein said clamping members are two generally U-shaped clamping member and said support members are two bracket members, each bracket member having a generally upwardly facing portion for mating to the vehicle frame for attachment thereto near the rearward end thereof and a generally forwardly facing portion to which a generally U-shaped clamping member is adjustably attached by fastening means, a horizontally disposed tube member is provided with a hitching means centrally attached thereto, said tube member is selectively clamped on each side of said hitching means by one of said U-shaped clamping members to said forwardly facing portion of each said bracket members to adjustably fix the position of each of said bracket members with respect to said tube member.

It is yet another important object of the present invention to provide a universally adjustable trailer hitch for attaching to the frames of vehicles of different widths wherein said clamping members are two generally U-shaped clamping member and said support members are two spaced apart frame members of said vehicle to which said generally U-shaped clamping member is adjustably attached by fastening means, a horizontally disposed tube member is provided with a hitching means centrally attached thereto, said tube member is selectively clamped on each side of said hitching means by one of said U-shaped clamping members to each of said vehicle frame members to adjustably fix the position said tube member with respect to said vehicle frame members.

It is still another important object of the present invention to provide a universally adjustable trailer hitch for attaching to the frames of vehicles of different widths wherein said clamping members are two generally U-shaped clamping member and said support members are two bracket members, each bracket member having a generally upwardly facing portion for mating to the vehicle frame for attachment thereto near the rearward end thereof and a generally downwardly facing portion to which a generally U-shaped clamping member is adjustably attached by fastening means, a horizontally disposed tube member is provided with a hitching means centrally attached thereto, said tube member is selectively clamped on each side of said hitching means by one of said U-shaped clamping members to said downwardly facing portion of each said bracket members to adjustably fix the position of each of said bracket members with respect to said tube member.

It is still another important object of the present invention to provide a universally adjustable trailer hitch for attaching to the frames of vehicles of different widths wherein said bracket members are two generally C-shaped members.

It is still another very important object of the present invention to provide the combination of a universally adjustable trailer hitch for attaching to the frames of vehicles of different widths and a vehicle having two spaced apart longitudinally extending frame members, said trailer hitch comprising two bracket members each bracket member having a generally upwardly facing portion for mating of each said bracket members to each said vehicle frame members for attachment thereto near the rearward end thereof by a first fastening means and a generally rearwardly facing portion to which a generally U-shaped clamping member is adjustably attached by a second fastening means, a horizontally disposed tube member is provided with a hitching means centrally attached thereto, said tube member is selectively clamped on each side of said hitching means by one of said U-shaped clamping members to said rearwardly facing portion of each said bracket members to adjustably fix the position of each of said bracket members with respect to said tube member to centrally position said hitching means between said frame members.

It is still another important object of the present invention to provide the combination of a universally adjustable trailer hitch for attaching to the frames of vehicles of different widths and a vehicle having two spaced apart longitudinally extending frame members wherein said vehicle frame members are generally C-shaped having an upper and lower flange, said upwardly facing portion of each said bracket members attached to said lower flange.

It is still another important object of the present invention to provide the combination of a universally adjustable trailer hitch for attaching to the frames of vehicles of different widths and a vehicle having two spaced apart longitudinally extending frame members wherein said upper and lower flanges project inwardly and said upwardly facing portion of each said bracket members elongated flat flanges attached to said lower flange.

It is yet another very important object of the present invention to provide the combination of a universally adjustable trailer hitch for attaching to the frames of vehicles of different widths and a vehicle having two spaced apart longitudinally extending frame members wherein said upwardly facing elongated flange is provided with one or more apertures, at least one said aperture in registration with a corresponding aperture in said lower flange of said C-shaped vehicle frame member, each registering aperture receiving a threaded bolt member and each said bolt member threadably receiving a threaded nut for fixedly attaching each said bracket member to said lower flange.

These and other objects and advantages of the invention as well as the details of the illustrative embodiment, will be more fully understood from the following specification and drawings, in which:

BRIEF DESCRIPTION OF THE DRAWINGS

The accompanying drawings, which are incorporated in and constitute a part of this specification, illustrate a preferred embodiment of the invention and, together with the description of the invention given above and the detailed description of the preferred embodiment given below, serve to explain the principles of the invention.

FIG. 1 is a perspective view of the universally adjustable trailer hitch of the present invention attached to rearward end of the frame members of a vehicle;

FIG. 2 is a partial sectional view taken on line 2—2 of FIG. 1;

FIG. 3 is a end view of the tube member of the universally adjustable trailer hitch of FIG. 1;

FIG. 4 is a partial front view of the tube member of the universally adjustable trailer hitch of FIG. 1;

FIG. 5 is a partially formed sheet metal plate from which the bracket member of the universally adjustable trailer hitch of FIG. 1 is finally formed;

FIG. 6 is an end view of the finally formed sheet metal support member or bracket member of the universally adjustable trailer hitch of FIG. 1;

FIG. 7 is an end view of the clamping member of the universally adjustable trailer hitch of FIG. 1;

FIG. 8 is a partial end view of another embodiment of the universally adjustable trailer hitch of the present invention;

FIG. 9 is a partial end view of another embodiment of the universally adjustable trailer hitch of the present invention;

FIG. 10 is an end view of the support member or bracket member of the universally adjustable trailer hitch of FIG. 9; and FIG. 11 is a partial end view of another embodiment of the universally adjustable trailer hitch of the present invention.

DETAILED DESCRIPTION OF THE INVENTION

Throughout the following description and drawings, an identical reference number is used to refer to the same element shown in the several figures of the drawings.

Referring to FIGS. 1–7, the universally adjustable trailer hitch of the invention is indicated at 10 which is shown attached near the rearward end of the frame members 12 of a vehicle 14.

The lateral distance between the two spaced apart longitudinally disposed frame members 12 is easily accommodated by the universally adjustable trailer hitch of the invention. This variation in width can vary by vehicle model (and year of manufacture) as well as by vehicle manufacturer. This variation in lateral width between the frame members of a small pickup truck and a full sized van can exceed nine inches.

The universally adjustable trailer hitch 10 includes two support or bracket members 16. The bracket members 16 are mirror images of each other, however, each bracket member could be interchanged if required for an installation to the frame members of a particular vehicle.

Each bracket member 16 has a generally upwardly facing portion 18 for mating to the vehicle, frame members 12 for attachment thereto near the rearward end thereof. Each bracket member 16 is further provided with a generally rearwardly facing portion 20. Each upwardly and rearwardly facing portions 18 and 20 are elongated flat flanges. As can best be seen from FIG. 6, the planes defined by each of the elongated flanges 18 and 20 perpendicularly intersect. Further, each of the upwardly and rearwardly facing elongated flat flanges 18 and 20 are formed such that they extend perpendicularly outward from the body portion 46 of the bracket members 16. As shown in FIG. 1, the bracket members 16 are mounted to the frame members 12 with the vertically disposed elongated flat flange members 20 and horizontally disposed flat flange members 18 extending inward.

A generally U-shaped clamping member 22 is adjustably attached to the rearwardly facing elongated flat flange 20 to selectively clamp a tube member 24 to the flange 20 to adjustably fix the position of each of the bracket members 16 with respect to the tube member 24. The rearwardly facing flange 20 is provided with one or more apertures 26 which are in registration with corresponding apertures 28 provided in the U-shaped clamping member 22.

The legs 42 of the U-shaped portion of said U-shaped clamping member 22 terminate in an outwardly projecting ear 44, each ear 44 has an aperture 26 therethrough. The ears 44 of the U-shaped clamping member 22 project perpendicularly outwardly from each of the legs 44.

The registering apertures 26 and 28 receive threaded bolt members 30 and each bolt members threadably receive a threaded nut 32 for adjustably attaching the U-shaped clamping member 22 to said rearwardly facing flange 20 with the tube member 24 selectively clamped therebetween.

The horizontally disposed tube member 24, which may be square in cross section, is provided with a hitch box 34 which is centrally attached, as by welding, to the tube member 24. The hitch box 34, which may be a tubular member square in cross section, projects perpendicularly from the rearwardly facing side 48 of the tube member 24. The hitch box 34 is adapted to receive a standard hitch ball supporting member (not shown) and is provided with an aperture 50 which receives a locking pin (not shown) to hold the hitch ball supporting member in place within the hitch box 34. A plate member 62 with elliptical openings 64 is also attached to the tube member 24 to provide a anchoring point for safety chains (not shown).

As can best be seen in FIG. 1, the tube member 24 is selectively clamped on each side of said hitch box 34 by one of the U-shaped clamping members 22 to the rearwardly facing flange 20 of each the bracket members 16 to adjustably fix the position of each of the bracket members 16 with respect to the tube member 24.

The inwardly facing clamping surfaces 52 of the U-shaped clamping member 22 are in intimate clamping contact with with three faces 48, 52 and 64 of the tube member 24 with the fourth forwardly projecting face 56 of the tube member 24 being seated on the rearwardly facing flat flange 20 of each of the bracket members 16.

The upwardly facing flange 18 is provided with one or more apertures 36 which are in registration with corresponding apertures (not shown) which may be provided in the vehicle frame members 12. The registering apertures receive a threaded bolt member 38, each of which threadably receive a threaded nut 40 for fixedly attaching each bracket member 16 to the vehicle frame members 12.

As can be seen in FIG. 5, the bracket members 16 may be formed from a flat sheet metal plate with the bend lines for the flat flanges 18 and 20 being denoted at 58 and 60 respectively. The bracket members 16 may be fabricated from a flat sheet metal plate of AISI-1012 steel while the clamping members 22 may be fabricated from flat sheet metal plate of AISI-1012 steel. The tube member 24 may be fabricated from ASTM-A-500 Grade B steel tubing.

The two spaced apart longitudinally extending frame members 12 of the vehicle 14 are generally C-shaped having an upper flange 58 and lower flange 60. The upwardly facing flange 18 of each of the bracket members 16 are attached at the downward projecting surface of the lower flange 60. The hitch 10 of the invention, is of course, suitable for use with other frame configurations such as box frames and the like. Typically, the lower frame flanges of vehicles are provided with a number of apertures near their rearward end for a number of purposes and these apertures may be used to attach the hitch 10 to the vehicle. If no such apertures are so provided, then they may be suitably drilled in the lower flange or like member without weakening the frame member.

In summary, the universally adjustable trailer hitch 10 for attaching to the frames of vehicles of different widths, is easily adjusted by simply loosening the nuts 32 on bolts 30 which effect the selective clamping of the tube member 24 against the flange 20 by the U-shaped clamping members 22. This loosening action allows for relative movement between the bracket members 16 and the tube member 24 to centrally locate the hitch box 34 and accommodate different lateral widths of different vehicles. The upward facing flange 18 is provided with a plurality of apertures so that they may be aligned with different patterns of apertures found near the rearward end of the frame members of different vehicles.

Referring to FIGS. 8-11, there is shown three additional embodiments of the universally adjustable trailer hitch of the invention.

These three embodiments illustrate the flexibility of the present invention in that they show different attachment orientations of the universally adjustable trailer hitch to the rearward end of the frame members 12 of a vehicle (not shown in FIGS. 8-11).

The FIG. 8 embodiment of the universally adjustable trailer hitch of the invention is essentially the same as the universally adjustable trailer hitch of FIGS. 1-7 except that the position of the bracket members 16 of FIG. 8 is reversed. In the reversed position of FIG. 8, the rearwardly facing flange 20 of FIGS. 1-7 is facing forwardly with respect to the vehicle. Accordingly, the hitch box 34 of the FIG. 8 embodiment is in a more forward position with respect to the vehicle than that of the FIGS. 1-7 embodiment.

The FIG. 9 and FIG. 10 embodiment of the universally adjustable trailer hitch of th invention is generally the same as the universally adjustable trailer hitches of FIGS. 1-8 except that the support or bracket members 16 of FIG. 1-8 has been replaced by a generally C-shaped support or bracket members 66 (only one bracket member shown in FIGS. 9 and 10). Elongated flange 68 generally performs the function of flange 18 of bracket member 16 of FIGS. 1-8 and similarly, elongated flange 70 generally performs the function of flange 20 of bracket member 16 of FIGS. 1-8.

The FIG. 11 embodiment of the universally adjustable trailer hitch of the invention is generally the same as the universally adjustable trailer hitches of FIGS. 1-10 except that the support or bracket members 16 of FIG. 1-8 and the support or bracket members 66 of FIGS. 9 and 10 have been eliminated. In the FIG. 11 embodiment of the universally adjustable trailer hitch of the invention, the clamping members 22 are attached directly to the frame member 12 of the vehicle.

While the present invention has been illustrated by description of several embodiments and while these embodiments have been described in considerable detail, it is not the intention of the Applicant to restrict or in any way limit the scope of the appended claims to such detail. Additional advantages and modifications will readily occur to those skilled in the art. The invention in its broader aspects is therefore not to be limited to the specific details shown and described. Accordingly, departures may be made from such details without departing from the spirit or the scope of the Applicant's general inventive concept.

What is claimed is:

1. A universally adjustable trailer hitch for attachment to an underside of two spaced apart frame members of a vehicle, said frame members spaced apart varying widths corresponding to various width vehicles, comprising a substantially square and horizontally extending tube member, a hitch box extending rearwardly from a rearward facing side of said tube square member, a pair of support brackets each having two elongated flanges disposed generally perpendicularly to each other and a body portion of the bracket, one of said flanges horizontally disposed and the other of said flanges vertically disposed, each of said flanges provided with a pair of spaced apart apertures extending therethrough, said brackets attached to the underside of said frame members by bolts extending upwardly through said apertures in said horizontally disposed flanges and corresponding apertures in said frame members, a pair of generally U-shaped clamps each having three inwardly disposed surfaces in intimate contact with three corresponding sides of said square tube member, each of said generally U-shaped clamps having a central U-shaped portion with legs terminating in outwardly projecting ears each provided with an aperture therethrough, said ear apertures in registration with the apertures in said vertically disposed flanges, a rearward side of said square tube member clamped against said vertically extending flanges by bolts extending forwardly through said apertures in said ears and corresponding apertures in said vertically extending flanges.

* * * * *